Nov. 21, 1950  J. N. HELTZEL  2,531,040

SEALED DOWEL BAR AND SHIELDED BEARING

Filed July 3, 1946

INVENTOR.
John N. Heltzel
BY
Mawhinney & Mawhinney
Attorneys

Patented Nov. 21, 1950

2,531,040

UNITED STATES PATENT OFFICE 2,531,040

SEALED DOWEL BAR AND SHIELDED BEARING

John N. Heltzel, Warren, Ohio

Application July 3, 1946, Serial No. 681,375

4 Claims. (Cl. 94—18)

The present invention relates to improvements in hermetically sealed dowel bars for use in connecting the slabs of concrete roads and has for an object to provide an improved dowel bar or load transfer element in which protection against the elements is provided with the end in view of the longer life of dowel bars.

Heretofore steel bearing plates have been exposed on the adjacent end faces of the slab to attacks by air and water, and such plates were therefore subject to rust and corrosion particularly where acids seeped into the joint and contacted the steel bearing plates.

It is another object of the invention to provide non-corrosive shields to cover the bearing plates in their submerged positions in the concrete whereby the structure is completely isolated from the elements.

It is a further object of the invention to extend these shields so as to cover not only the bearing plates but also those portions of the dowel bars which are apt to encounter contact with acids or the elements.

Concrete roads as presently constructed are ordinarily laid in monoliths with compressible expansion joint material embedded in the same at preselected intervals which form planes of weakness in the structure resulting, when cured, in the cracking of the concrete below the joint material to create individual slabs capable of individually contracting and expanding under heat and cold conditions.

It is well known in the art that unless the sections are secured in position by dowels or other means to prevent the sections from moving vertically out of alignment the surface of the roadway will become irregular causing the slabs to deteriorate on the passage of traffic. It appears that no dowel bar has yet been produced which would function properly for more than five years. However, inasmuch as the concrete used in modern roads and airports is being scientifically proportioned and mixed and consists of materials of the very highest quality, it is reasonable to expect that modern concrete structures of this kind should be serviceable for an indefinite period of time. However, in view of the limitations which authorities have placed on dowel bars, it is indicated that the life of the highway or airport is based on the efficiency and life of the dowel bar. Assuming that the present form of dowel bar can not exceed a life greater than five years, under present circumstances it involves a tremendous waste of money and effort to build road and airport structures of this kind.

It is therefore an important object of the invention not so much to change or improve the dowel bar per se which has crystallized into a definite steel structure of a generally approved form having the requisite strength but to so construct and arrange the accessories to the dowel bar installation that such dowel bars will not be exposed to the elements and in this way to promote the longer life of the dowel bar and its continuance indefinitely as a properly functioning road transfer element.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary perspective view showing an improved hermetically sealed dowel bar as constructed in accordance with the present invention;

Figure 1:
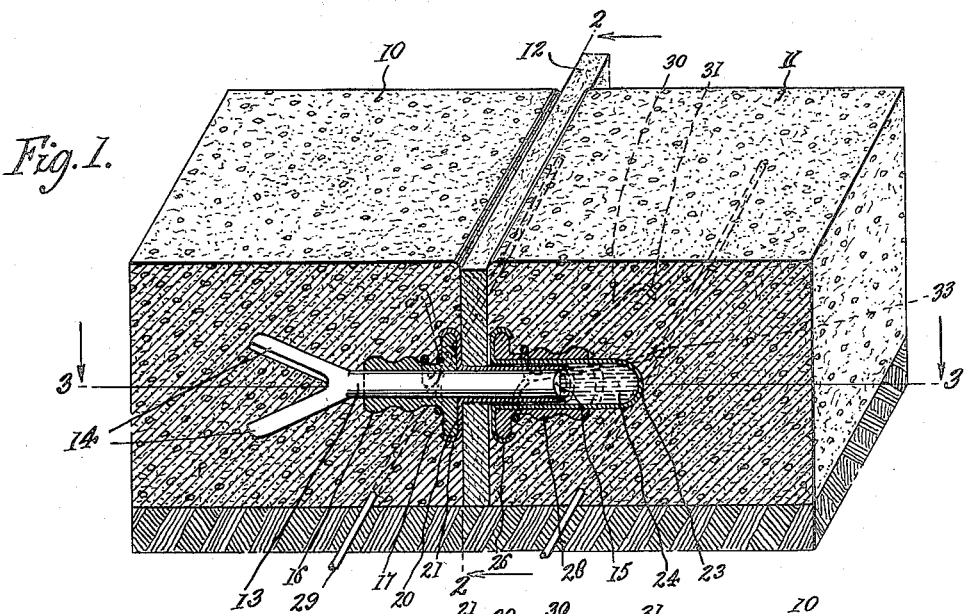

Referring more particularly to the drawings 10 and 11 designate adjacent concrete slabs of a roadway or airport and 11 represents the joint material between the faces of adjacent slabs. The dowel bar is indicated at 13 having the split end 14 and according to the invention having its other end 15 arranged as a piston.

A first tubular bearing 16, preferably externally corrugated, is embedded in one of the slabs 10 with its bearing plate 17 preferably flush in the face of such slab 10 adjacent the joint 12. A non-corrosive first sleeve shield 18 surrounds the piston end of the dowel bar 15, spans the device between the slabs 10 and 11 and has its remote end 19 open. At its proximate end is a disc 20 extending over the face of the first bearing plate 17 which is exposed at the joint face of the slab 10. The marginal edge of the disc 20 is flanged over the peripheral edge of the first bearing plate 17 as indicated at 21.

A second non-corrosive sleeve shield 22 is relatively slidable over the first sleeve shield 18 and has a closed remote end 23 spaced from the piston end 15 of the dowel bar 13 to constitute a lubricant chamber 24 and the units of a hydraulic ram. A disc 25 at the proximate end of the second shield 22 extends over the exposed face of the second bearing plate 27 upon a second externally corrugated tubular bearing 28 which receives therethrough the second sleeve shield 22. A flange 26 on the disc 25 surrounds and protects the peripheral edge of the second bearing plate 27.

Figure 2:
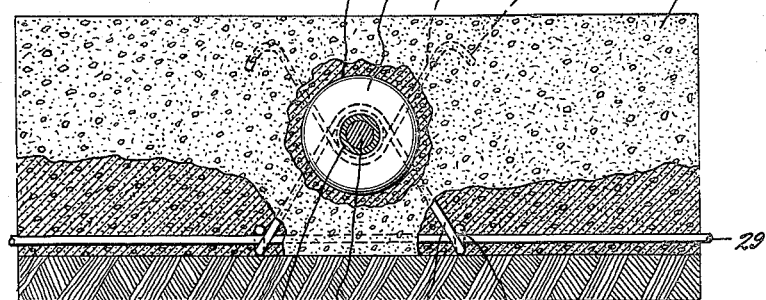
Figure 2 is a vertical section taken on the line 2—2 in Figure 1.
Figure 3:
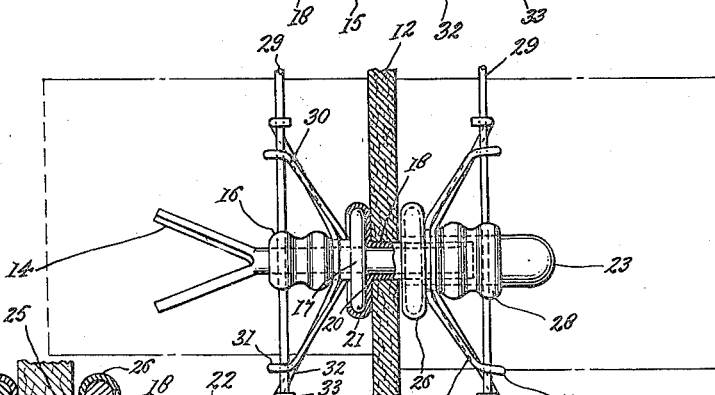
Figure 3 is a horizontal section taken on the line 3—3 in Figure 1.

Base rods 29 are mounted in each of the slabs below the tubular bearings 16 and 28. Affixed to these tubular bearings 16 and 28 are upper and lower anchorage members 30 and 32. The upper anchorage members 30 may have outwardly and downwardly turned hooks 31 to take better purchase in the concrete slab. As shown in Figure 2 these upper members 30 preferably diverge upwardly. As shown in Figure 3 the members preferably incline diagonally to the plane of the joint strip 12.

The lower anchorage members 32 may have loops 33 at their lower ends slidably engaging about the longitudinal base rods 29. These lower anchorage members 32 are flexible so as to be bent closer together or to be moved farther apart whereby to elevate or lower the tubular bearings 16, 28 which they support. Where the anchorage members are made from flexible wire of suitable rigidity they may be wound about certain of the corrugations of the tubular bearings 16 and 28 and welded or otherwise affixed thereto.

The dowel bar 13 is anchored fixedly in the slab 10 by the split end 14 embedded in the concrete. The bearing sleeve 16 which is received over the intermediate portion of the dowel bar 13 is also so embedded in the concrete that it is immovable relatively to the slab 10. Consequently the dowel bar 13 and the bearing sleeve 16 do not have relative movement. Moreover the bore of the bearing sleeve 16 is such relatively to the external diameter of the dowel bar 13 that the dowel bar has to be driven into and through the bearing sleeve 16; and consequently the same have a tight fit preventing relative movement. The sleeve shield 18 is held fixedly to the bearing sleeve 16 by reason of the fact that the flange 21 engages over the bearing plate 17. Consequently the sleeve shield 18 is held immovable with respect to both the sleeve bearing 16 and the dowel bar 13.

The second sleeve shield 28 is embedded fixedly in the opposing slab 11 and its sleeve shield 22 is immovable relatively to the bearing sleeve 28 by being flanged over at 26 upon the bearing plate 27. Therefore on relative expansion or contracting movement of the adjacent slabs 10 and 11, the shield 22 will always move with the bearing sleeve 28 and slab 11 while the complementary sleeve shield 18 moves with the dowel bar 15, bearing sleeve 16 and the opposed slab 10. Therefore it will be understood that the relative reciprocating movement takes place between the sleeve shields 18 and 22 and the same have a loose fit to permit of the liquid being pumped out into the joint space between the joint strip 12 and the two lined faces of the bearing plates 17 and 27.

Figure 4:
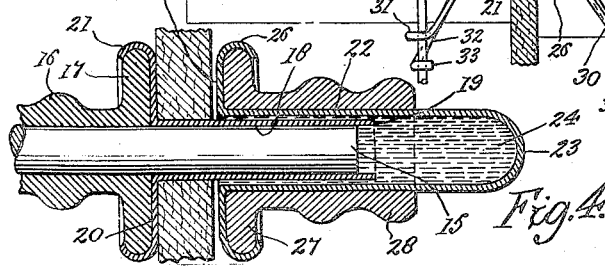
Figure 4 is a fragmentary section, taken on an enlarged scale, of the dowel bar, its bearing members and the improved shield construction.

In the use of the device any seepage of water down through the joint 12 into the device between the slabs 10 and 11 which would ordinarily directly contact the steel dowel rod 13 is now met by the non-corrosive tubular shield 18, being diverted thereto by the curved upper walls of the flanges 20 and 21 which prevents any such seepage from welling over onto the external surfaces of the tubular bearings 16 and 28. The liquid seepage between joint 12 and disc 20 cannot move to the left as seen in Figures 1 and 4 because of the integrality of the sleeve shield 18 with such disc 20. Therefore such seepage tends to move to the right between the joint material 12 and the first tubular non-corrosive shield 18. It therefore meets any seepage descending between the joint 12 and the second disc 25. Both seepage currents have only one outlet and that is between the two non-corrosive tubular shields 18 and 22. However this space is filled with the lubricant from the chamber 24 by reason of the hydraulic ram effect and action produced by the relative reciprocating movements of the two shield members 18 and 22 upon one another incident to the relative contraction and expansion of the concrete slabs 10 and 11 inasmuch as these two non-corrosive sleeve members 18 and 22 are affixed to move with the tubular bearings 16 and 28 which are respectively embedded in the slabs 10 and 11 and by reason of their corrugated external cylindrical surfaces are fixed against relative movement in such slabs. Therefore the piston 15 and the closed proximate end 23 of the second tubular shield 22 move together and apart in accompaniment to the similar movements of the slabs 10 and 11. Thus a film of lubricant is maintained in the space between the two non-corrosive tubular shields 18 and 22. For clearness this space is magnified and emphasized in Figure 4 which is an enlarged view.

The socket or bearing member 16 is of metal for instance pressed malleable steel, a casting or a forging, the external corrugations providing anchorage in the concrete. The dowel bar 13 may consist of a conventional roughly finished steel bar which is split at 14 also to provide anchorage of the dowel bar in one slab 10 of the concrete row. The dowel bar 14 is forced through the socket 16 and is maintained in a fixed position with respect to the socket. The dowel bar 13 is thus held at its split end immovably in one slab 10 of the concrete while its other end 15 projects into the other slab 11, such slab 11 being movable with respect to the dowel bar 13. The socket or tubular bearing 28 is similar to the socket 16 except that the bore of the former is slightly larger than the latter so as to permit the free sliding of the tubular shield 22 upon the first or inner tubular shield 18, the remote end 19 of which is left open to permit the piston 15 to have access to the hydraulic chamber 24. Thus is will be seen that the free or piston end 15 of the steel dowel bar 13 is hermetically encased within the two relatively movable non-corrosive shields 18 and 22.

The shields 18 and 22 are preferably constructed of light-wall tubing, preferably embodying an alloy which is corrosion resisting. For instance Monel metal or stainless steel may be used.

The seepage will not mix with the lubricant and the presence of the lubricant between the shields will tend to exclude water. It will also lubricate the movable bearing surfaces between the two shields.

In order to provide a stabilized structure during the installation of the dowel bars and when pouring the concrete, and to provide additional stress-relieving anchorages of the structure within the slabs, the anchorage members 30 and 32 are provided, the former projecting up into the top portions of the slabs while the lower members 32 project downwardly into the lower portions of such slabs. It will be particularly noted that these anchorage elements 30 and 32 are very close to the adjacent joint faces of the slabs, So placed they will immediately take up tension when traffic loads are applied.

A plurality of dowel bars 13 may be spaced apart by looping or otherwise securing the lower anchorage members 32 to the longitudinal bars 29 as indicated at 33.

The lower supports 32 are positioned on the subgrade as indicated in Figure 2. Such subgrade is irregular as to elevation. By moving the two lower members 32 together the dowel bar support may be raised to a higher elevation; on the other hand should the dowel bar need to be lowered, the supports 32 would be spread further apart. Such movement of the legs 32 is very readily accomplished in the field because these elements 32 are preferably made of a material of approximately 1/4 inch in diameter.

During the winter seasons the slabs 10 and 11 are contracted. This shortening of the slabs causes an opening on each side of the joint member 12 permitting surface water and foreign matter to infiltrate as previously described; however, no deterioration of the load transfer element results because of the shielding members 18 and 22.

It is obvious that various changes and modifications may be made in the details of construction and design of the above specifically described embodiment of this invention without departing from the spirit thereof, such changes and modifications being restricted only by the scope of the following claims.

I claim:

1. In a load transfer device, a dowel bar adapted to bridge the joint space between two concrete slabs, a tubular bearing affixed to one end portion of said dowel bar and having a bearing plate adapted to align with the edge face of one of the slabs, a sleeve shield of non-corrosive material having a disc at one end flanged over said bearing plate and embracing the free portion of said dowel bar, a socket of increased bore loosely receiving the free end portion of said dowel bar and non-corrosive shield assembly, said socket comprising an opposed tubular bearing and non-corrosive sleeve, said bearing having a bearing plate adapted to align with the edge face of the other slab and said last mentioned non-corrosive sleeve having a disc flanged over said last mentioned plate and extending through the bore of said last mentioned bearing and having a closed end spaced from the free end of the dowel bar to form a liquid containing chamber, whereby liquid will be forced between the non-corrosive sleeves upon movement of the free end of the dowel bar in said chamber.

2. In a load transfer device, a dowel bar adapted to bridge the joint space between two concrete slabs, a bearing plate adapted to align with the free edge face of one of the slabs, a sleeve shield having a disc at one end flanged over said bearing plate and embracing the free portion of said dowel bar, a socket of increased bore loosely receiving the free end portion of said dowel bar and shield, said socket comprising a bearing plate adapted to align with the free edge face of the other slab and a second sleeve having a disc flanged over said last mentioned bearing plate, said second sleeve having a closed end spaced from the free end of the dowel bar to form a liquid containing chamber, whereby liquid will be forced between the sleeves upon movement of the free end of the dowel bar in said chamber.

3. A load transfer device as claimed in claim 2 characterized by the fact that said first sleeve shield has a substantially smooth internal wall tightly embracing the external surface of the dowel bar from end to end of said first sleeve shield, the space between the sleeves being open to the joint space whereby the body of liquid in the space between the sleeves opposes the entrance of surface liquid to the chamber and dowel bar.

4. A load transfer device according to claim 3 in which the free end of the first sleeve shield extends beyond the free end of the dowel bar, the free end of the first sleeve being open to expose the free end of the dowel bar to the liquid in the chamber.

JOHN N. HELTZEL.

REFERENCES CITED

The following references are of record in the file of this patent:

UNITED STATES PATENTS

| Number | Name | Date |
|---|---|---|
| 2,110,738 | Parker | Mar. 8, 1938 |
| 2,256,930 | Willard | Sept. 23, 1941 |
| 2,269,703 | Bagwill | Jan. 13, 1942 |
| 2,291,109 | Sensibar | July 28, 1942 |
| 2,319,713 | Williams | May 18, 1943 |
| 2,419,022 | Heltzel | Aug. 15, 1947 |